Patented June 2, 1953

2,640,781

UNITED STATES PATENT OFFICE 2,640,781

FOOD PRODUCTS AND METHOD OF PRODUCING THE SAME

Jan Grader, Washington, D. C.

No Drawing. Application August 8, 1950,
Serial No. 178,340

4 Claims. (Cl. 99—126)

The present invention is concerned with the production of a new variety of food and relates both to a novel method of producing the food and to a novel food product. The new variety of food may serve as a relish to enhance and make more palatable cooked, roasted or boiled meats, as a spread or filler for sandwiches, crackers and the like or as a condiment or extender with rice, macaroni, spaghetti, noodles and similar food pastes.

In accordance with the present invention, gelatinous meat stock, shelled roasted peanuts and tomatoes or pimentos, or both tomatoes and pimentos, are combined and treated in such a manner that the resulting new variety of food is stabilized. By the term "stabilized" is meant that the oil of the peanuts does not tend to separate upon standing. Apparently the peanut oil is emulsified and stabilized in the emulsified condition. The food product is characterized by a tart and nutty flavor and a smooth and semi-liquid or plastic consistency. Where the food is to be used as a relish, a relatively thinner consistency is preferable, whereas, if the food is to be used as a spread, then a relatively thicker consistency is preferred. The consistency can be varied widely depending upon the characteristics desired. Any suitable seasoning, vegetables or modifiers may be incorporated in the mixture depending upon the intended use of the food.

The gelatinous meat stock, roasted peanuts and tomatoes or pimentos are cooked until the peanuts are tender. The mixture is then finely divided, preferably while hot, to form a smooth homogenous product. The other ingredients, preferably in a finely chopped condition, may be added to the ground mixture and cooked or the other ingredients may be incorporated in the mixture before cooking the peanuts. Some or all of the ingredients, particularly the materials used for seasoning purposes may be cooked in the meat stock as it is being prepared. After all of the ingredients have been cooked, the mixture is preferably forced through a fine sieve to improve its consistency and uniformity. It is important that the gelatinous meat stock, peanuts and tomatoes or pimentos be cooked together to tenderize and swell the peanuts. This cooking is essential to prevent subsequent separation of the oil into an oily layer on top of the food product. As the peanuts are cooked, they first start to swell and then become quite tender. If this cooking is continued too long, the peanuts will start to shrink and toughen. Accordingly, the cooking should not be continued long enough to toughen and shrink the peanuts or the resulting product will be a gritty mass. The reason why the peanuts are toughened is not fully known, but it is believed that toughening of the peanuts by extended cooking may be the result of protein conversion. This cooking also breaks up and disperses the tomatoes or pimentos throughout the mixture. Cooking may be effected by open kettle boiling or in a closed vessel under pressure. The important steps are that the mixture be cooked until the peanuts are tender and that the peanut-containing mixture be finely divided after the cooking step. Any suitable means, such as a food chopper, may be used for finely dividing the mixture to divide the peanuts and form a homogeneous mixture.

Another important feature is that a gelatinous meat stock be used. Gelatinous meat stock may be prepared from veal, beef, chicken or any other variety of meat that will produce a meat stock that at room temperature has a thickened consistency as a result of the gelatin in the stock. Preferably, the meat stock contains sufficient gelatin to form at room temperature a gel.

The following example illustrates the preparation of a suitable meat stock and is not intended to limit the present invention to this particular meat stock unless so stated:

*Preparation of one U. S. gallon of gelatinous stock*

6 lbs. veal shanks
4 lbs. cracked veal bones
9 ozs. sliced carrots
5 ozs. coarsely chopped onions
1 bay leaf
1½ ozs. parsley roots
1 sprig of thyme
½ oz. salt
¼ oz. peppercorns
1 gal. water In preparing the meat stock, the meat and bones were browned in an open roasting pan in a hot oven at about 450° F. for twenty minutes. The fat was drained off and the chopped vegetables were then added to the pan along with a relatively small amount of water. This mixture was boiled down slowly on top of the stove until nearly evaporated and then a small amount of water was again added and the procedure repeated. Thereafter one gallon of water was added to the pan and the pan covered and the mixture brought to a boil. The mixture was simmered for six hours and during this period the scum and grease that collected on top was removed. This stock was strained through a cheese cloth and produced about one gallon of gelatinous meat stock.

In the following recipes, the gelatinous meat stock is the meat stock previously described. Recipes numbered 1 to 3, inclusive, produce a relatively thinner sauce, that is, the products contain a relatively higher percentage of water and lower percentage of peanuts. Recipe number 4 is for a spread for bread or crackers and is relatively thicker.

Recipe No. 1 Sauce:
```
    Gelatinous meat stock_____quarts__  1
    Roasted peanuts_____ounces__  4
    Tomatoes _____do_____ 14
    Onions _____do_____  4
    Garlic _____do_____  1
    Salt to taste
```

Recipe No. 2:
```
    Gelatinous meat stock_____quarts__  1
    Roasted peanuts_____ounces__  4
    Tomatoes _____do_____ 14
    Shrimp _____do_____  6
    Tarragon _____grains__  1
    Salt to taste
```

Recipe No. 3:
```
    Gelatinous meat stock_____quarts__  1
    Roasted peanuts_____ounces__  4
    Tomatoes _____do_____ 14
    Onions _____do_____  2
    Garlic _____do_____  1
    Salt to taste
```

Recipe No. 4:
```
    Gelatinous meat stock_____quarts__  1
    Roasted peanuts_____ounces__  8
    Tomatoes _____do_____ 14
    Garlic _____do_____  1
    Red pepper
```

For all of the above recipes, at least the gelatinous meat stock, peanuts and tomatoes were boiled together until the peanuts had swelled and become tender. This required about ½ to ¾ of an hour. The cooked mixture was then finely divided by a mechanical process. In recipe No. 2, the cooked shrimp and tarragon were added to the chopped peanut mixture. In the other recipes all of the ingredients were cooked together. After being finely divided, the mixtures were boiled until the desired consistency was obtained. It is to be noted that the mixture stiffens when cooled to room temperature and should be thinner than desired when hot. After cooking was completed to remove the water, the cooked mixtures were forced through a sieve to improve the uniformity of the product. This is not essential although preferable. The additional cooking after grinding or finely dividing the tenderized peanuts did not seem to toughen the peanuts.

The present food products may be combined with other materials or may be used alone and modifiers other than shrimp may be used as well as other vegetables and seasoning.

I claim:

1. The process of producing a stabilized food product comprising the steps of cooking a mixture including gelatinous meat stock, shelled roasted peanuts and at least one ingredient selected from the group consisting of pimentos and tomatoes until the peanuts swell and tenderize and then finally dividing the resulting mixture.

2. The process of producing a stabilized food product comprising the steps of cooking a mixture including gelatinous meat stock, shelled roasted peanuts and at least one ingredient selected from the group consisting of pimentos and tomatoes until the peanuts swell and tenderize, finely dividing the resulting mixture and then boiling the mixture to remove excess moisture.

3. A smooth, homogeneous stabilized food product comprising finely divided cooked, roasted peanuts dispersed in a stabilized emulsion of gelatinous meat stock and at least one ingredient selected from the group consisting of pimentos and tomatoes.

4. A smooth, homogeneous stabilized food product comprising a cooked mixture of shelled roasted peanuts, at least one ingredient selected from the group consisting of pimentos and tomatoes and gelatinous meat stock.

JAN GRADER.

References Cited in the file of this patent

UNITED STATES PATENTS

| Number | Name | Date |
|---|---|---|
| 805,001 | Bright | Nov. 21, 1905 |
| 1,007,142 | Rademacher | Oct. 31, 1911 |
| 1,076,825 | Hamilton | Oct. 28, 1913 |
| 1,921,585 | Rooker et al. | Aug. 8, 1933 |
| 2,079,288 | Hoffman | May 4, 1937 |
| 2,131,064 | Musher | Sept. 27, 1938 |